(12) United States Patent
Isebrand

(10) Patent No.: US 6,827,485 B2
(45) Date of Patent: Dec. 7, 2004

(54) FAST RESPONSE TEMPERATURE SENSOR

(75) Inventor: Scott D. Isebrand, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 10/196,308

(22) Filed: Jul. 16, 2002

(65) Prior Publication Data

US 2004/0013160 A1 Jan. 22, 2004

(51) Int. Cl.$^7$ .............................. G01K 1/08; G01K 1/14; G01K 13/00; G01K 13/02
(52) U.S. Cl. ...................... 374/141; 374/208; 374/144; 374/138
(58) Field of Search ................................ 374/141, 142, 374/144, 152, 148, 208, 153, 138; 60/39.092

(56) References Cited

U.S. PATENT DOCUMENTS

| | | | | |
|---|---|---|---|---|
| 2,970,475 A | * | 2/1961 | Werner ..................... 374/138 |
| 3,400,583 A | * | 9/1968 | Newport et al. |
| 3,596,467 A | * | 8/1971 | Avery ..................... 60/39.2 B |
| 3,597,920 A | * | 8/1971 | Wadman ................ 60/39.51 R |
| 3,677,079 A | * | 7/1972 | Hoeflinger .................... 73/147 |
| 3,818,678 A | * | 6/1974 | Gothard ......................... 55/13 |
| 3,899,878 A | * | 8/1975 | Compton et al. ....... 60/39.28 T |
| 4,047,379 A | * | 9/1977 | Brookes et al. ............. 60/39.09 |
| 4,137,710 A | * | 2/1979 | Preti et al. ..................... 60/223 |
| 4,152,938 A | * | 5/1979 | Danninger .................. 374/139 |
| 4,219,738 A | * | 8/1980 | Griesinger ................ 290/40 R |
| 4,595,299 A | * | 6/1986 | Lindwall et al. ............ 374/153 |
| 4,770,040 A | * | 9/1988 | Hooper et al. ................ 73/335 |
| 4,830,515 A | * | 5/1989 | Cortes ......................... 374/208 |
| 4,991,976 A | | 2/1991 | Byles .......................... 374/135 |
| 5,372,618 A | * | 12/1994 | Andrus, Jr. ..................... 48/87 |
| 5,396,778 A | * | 3/1995 | Bolton et al. ................. 62/156 |
| 5,662,418 A | * | 9/1997 | Deak et al. .................. 374/144 |
| 5,731,507 A | * | 3/1998 | Hagen et al. ................. 73/182 |
| 5,816,704 A | * | 10/1998 | Campbell et al. ............. 374/28 |
| 6,020,552 A | * | 2/2000 | Rickman ..................... 136/230 |
| 6,390,673 B1 | * | 5/2002 | Camburn ..................... 374/179 |
| 6,551,517 B1 | * | 4/2003 | Sentagnes et al. .......... 210/719 |
| 6,609,825 B2 | * | 8/2003 | Ice et al. ..................... 374/138 |
| 6,619,115 B2 | * | 9/2003 | Lenzing et al. .......... 73/204.21 |

* cited by examiner

Primary Examiner—Gail Verbitsky
(74) Attorney, Agent, or Firm—Westman, Champlin & Kelly, P.A.

(57) ABSTRACT

A turbine engine temperature sensing assembly includes a temperature sensor probe mounted relative to a surface of a turbine engine and subjected to air flow. The air moves past the temperature sensor probe in a first direction. A deflector post is mounted adjacent to the temperature sensor probe, and is spaced upstream of the temperature sensor probe to change air flow patterns around the temperature sensor probe and to intercept particles moving with the air flow toward the temperature sensor probe. The temperature sensor probe and deflector post are shown supported in a flow duct formed by a temperature sensor probe housing.

9 Claims, 5 Drawing Sheets

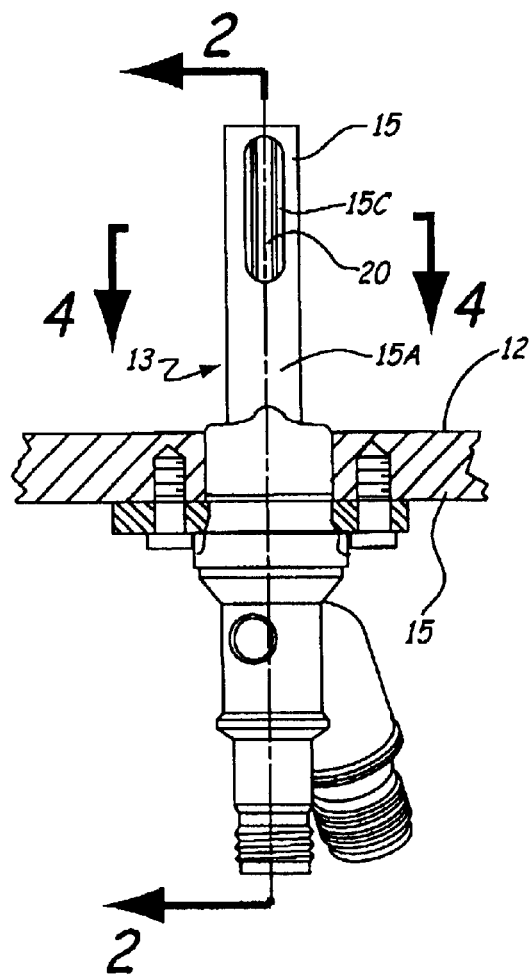
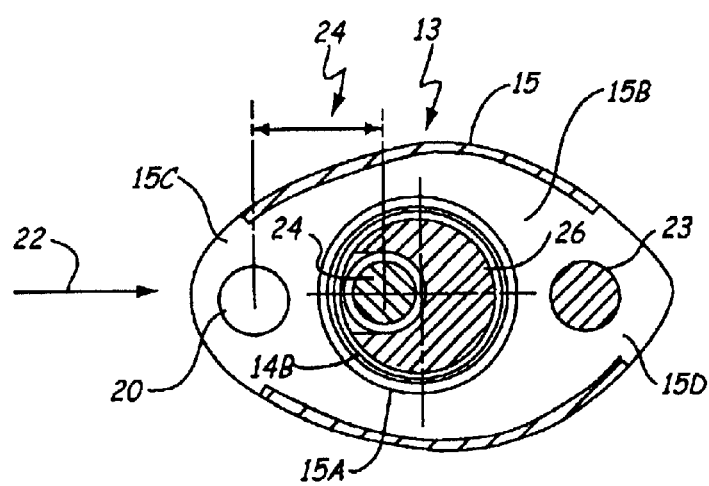
Fig. 3
Fig. 4

FAST RESPONSE TEMPERATURE SENSOR

BACKGROUND OF THE INVENTION

The present invention relates to a turbine temperature sensor probe assembly projecting from the surface of a turbine inlet into the air flow stream with a post or projection supported upstream of a temperature sensor probe to provide protection for the temperature sensor probe from airborne debris. The post is spaced at a distance such that the air flow is separated as it reaches the temperature sensor probe, to provide for a more rapid sensor response changes in inlet temperature.

A critical factor for a turbine engine temperature sensor is time response. In most applications, it is desired to have a fast time response, meaning the faster that a temperature sensor can respond to a change in temperature of a flowing media such as air, or other fluids, the better. The temperature sensor typically has a sensing element such as a temperature sensitive resistor inside a sheath or housing to form a temperature probe. It is desirable to minimize the housing material in direct contact with the temperature sensing element, since reducing the covering material reduces the time constant of the sensor probe. Minimizing material in contact with the sensing element, that is, reducing the material in the outer sheath or housing, can mean that the temperature sensor probe is more susceptible to damage from particles, or other objects carried in the fluid that is passing over the sensor.

The present invention permits reducing the thickness of the sheath or housing for the sensing element making up the temperature sensor probe so that there will be a fast time response, while also reducing the likelihood of damage to the temperature sensor probe from particles or objects carried in the fluid stream moving past the probe.

SUMMARY OF THE INVENTION

The present invention relates to a temperature sensor probe assembly that comprises a temperature sensor probe that is mounted on a housing that projects into a fluid stream, usually an air stream. The temperature sensor probe has a temperature sensing element that has a covering or outer shell made with a minimum amount of material surrounding the sensing element. The temperature sensor probe is supported on the probe assembly housing in a through passageway or duct formed in the housing for air flow. A post is positioned in the housing passageway upstream from the temperature sensor probe, relative to the airflow direction, to cause a flow disruption to improve time response and to intercept airborne objects and divert such objects so they flow around the temperature sensor probe and do not strike it.

The upstream post as shown is generally cylindrical, as is the sensor probe. Other cross sectional shapes will work. The size of the deflector post does not have to be the same as that of the temperature sensor probe, so the deflector post or object can be made robust to withstand impact of airborne materials against it. The post also can have a different cross sectional shape from the temperature sensor probe, and can be elliptical, hexagonal, or other selected shape. The post is secured to the housing in the duct or passageway through which air flows. The deflector post protects the temperature sensor probe so the sensor probe can be made with a minimum amount of material surrounding the temperature sensing element such as a temperature sensitive resistor, for improving time response.

BRIEF DESCRIPTION OF THE DRAWINGS

FIG. 3 is a front view of the probe assembly of FIG. 1;

FIG. 4 is a top plan view of the temperature sensor probe shown in FIG. 1;

DETAILED DESCRIPTION OF THE ILLUSTRATIVE EMBODIMENTS

Figure 1:
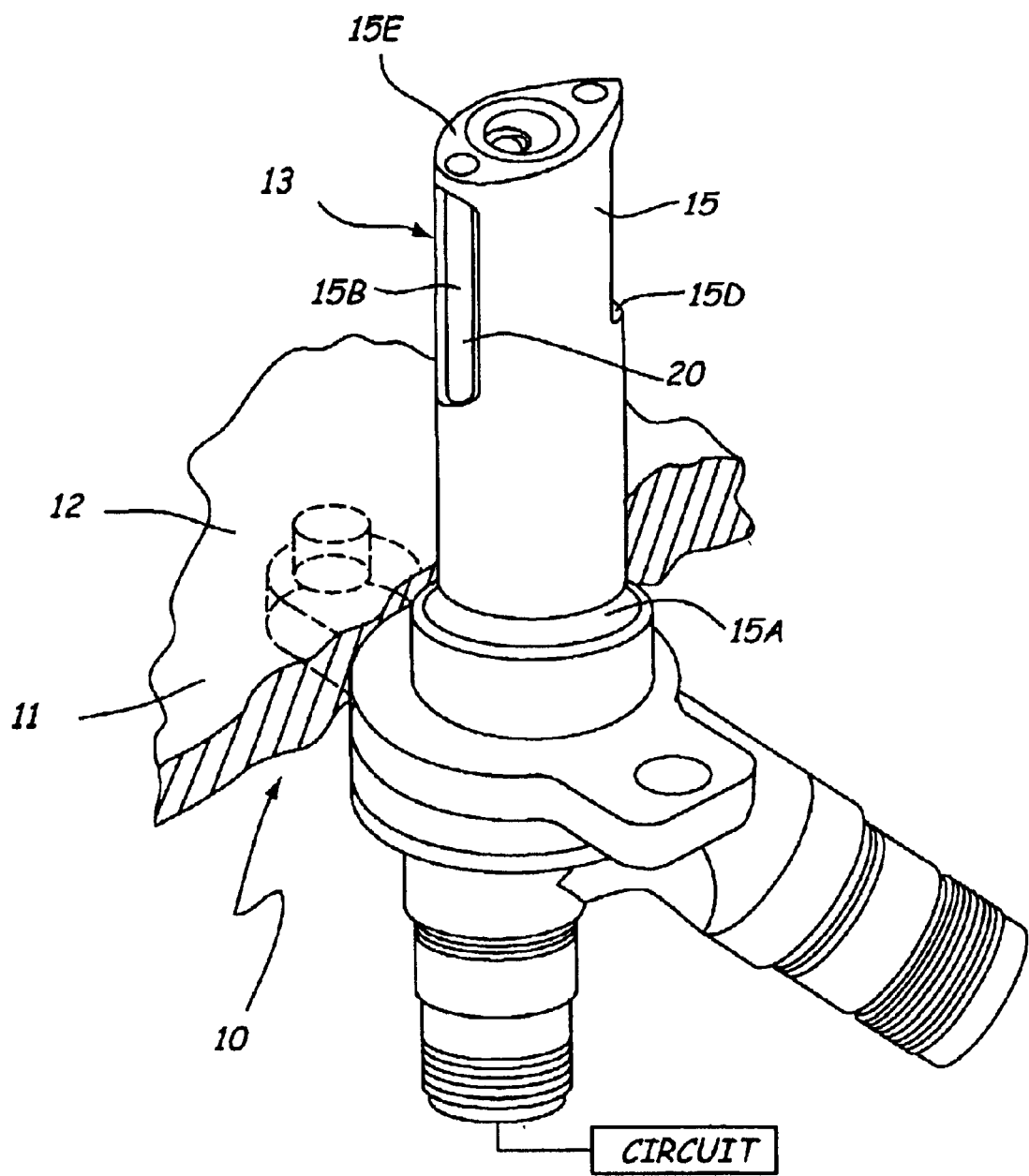
FIG. 1 is a perspective view of a temperature sensor probe assembly having an upstream deflector made according to the present invention installed on a surface of an inlet to a turbine engine.
Figure 2:
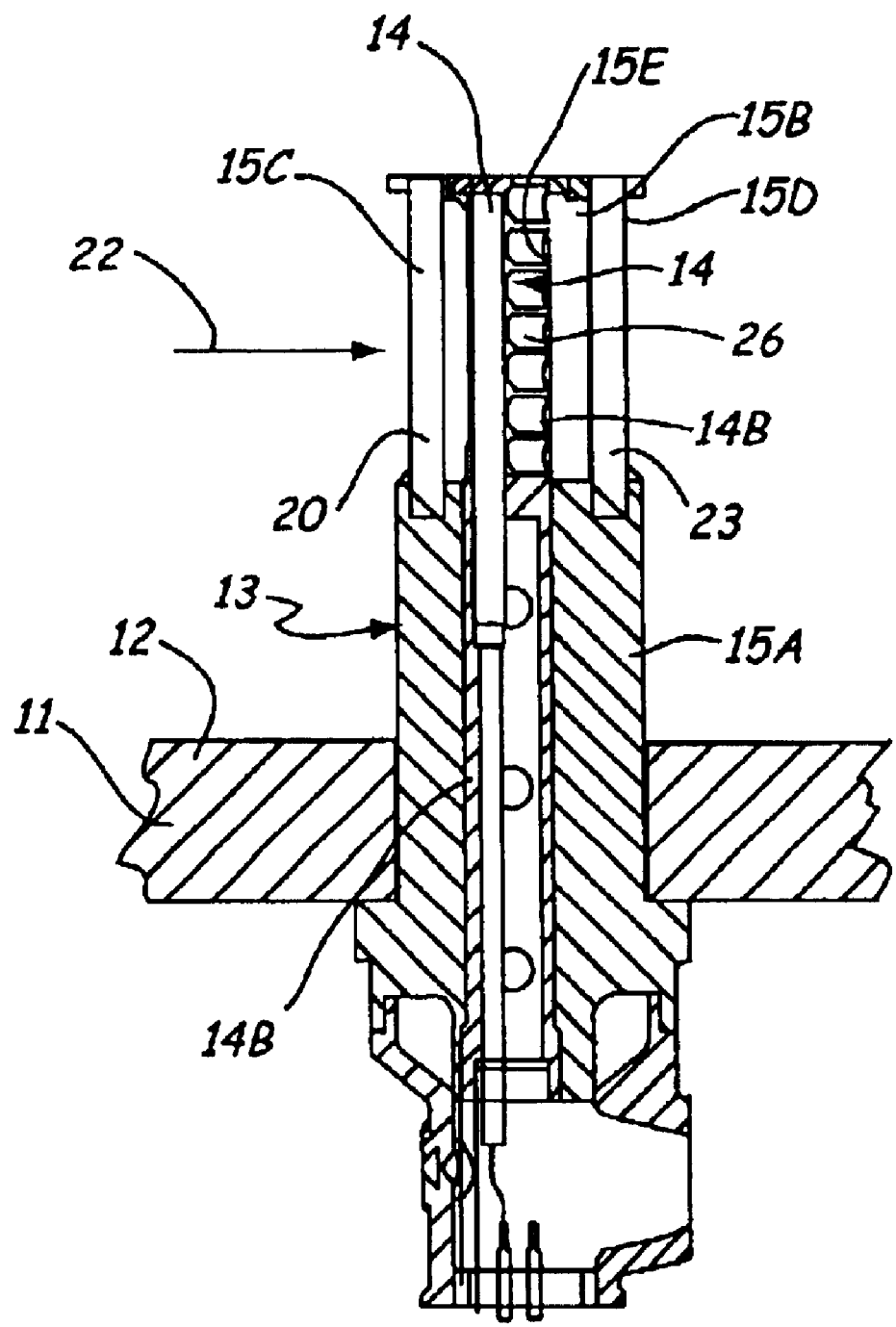
FIG. 2 is a center sectional view of the probe assembly shown in FIG. 1.

Referring to FIG. 1, a turbine engine indicated generally at 10 has an inlet wall 11 having a surface 12. A temperature sensor probe assembly 13 is fixed to the wall 11 in a suitable manner and protrudes upwardly from the surface 12.

The probe assembly comprises an outer probe housing 15 that has a solid base 15A with an air flow duct probe or passageway 15B formed at an upper portion and extending from the front to the rear. An inlet opening 15C faces toward the air flow, and an outlet opening 15D is provided at the rear or downstream end of duct 15B. A temperature sensor probe 14 is mounted in duct 15B between base 15A and a cap wall 15E.

It should be noted that the temperature sensor probe 14 is small, being generally in the range of ⅛" in width and quite short.

The temperature sensor probe 14 is supported in a base housing 14B that extends into a bore in a solid portion 15A of the housing 14B.

The probe 14 is susceptible to damage from various size particles that may be swept into the turbine engine, particularly when an aircraft is on or near the ground. Such particles can easily damage a sensor probe that is of the desired small size.

A flow guide 26 extends upwardly from the face housing 15A and the temperature sensor probe can be supported to guide 26 at selected intervals.

In order to provide a temperature sensor probe that is small diameter, with a minimum amount of material in the housing surrounding the sensing element, so that the temperature response is fast, a cylindrical deflector post 20 is mounted on the base 15A and extends to cap wall 15E, substantially parallel to the temperature sensor probe 14. The cylindrical deflector post 20 is positioned right at inlet 15C and is spaced in an upstream direction in duct or passage 15B from the temperature sensor probe 14. The post 20 is narrower than the width of inlet 15C, so air flows in through the side portion of the inlet and around the deflector post.

The normal flow direction of air or other fluid past the temperature sensor is shown by arrow 22. The deflector post 20 acts as a flow diverter and interceptor of particles carried in the fluid stream. The upstream deflector post 20 can be made substantially the same size as or larger than the sensor probe 14 to increase the post strength, and make it more robust.

The cap wall 15E is provided at the outer end of probe housing 15 and the deflector post 20 is secured to wall 15E.

A second support port 23 can be provided at the downstream or rear side of the flow duct to support wall 15E as well.

Figure 5:
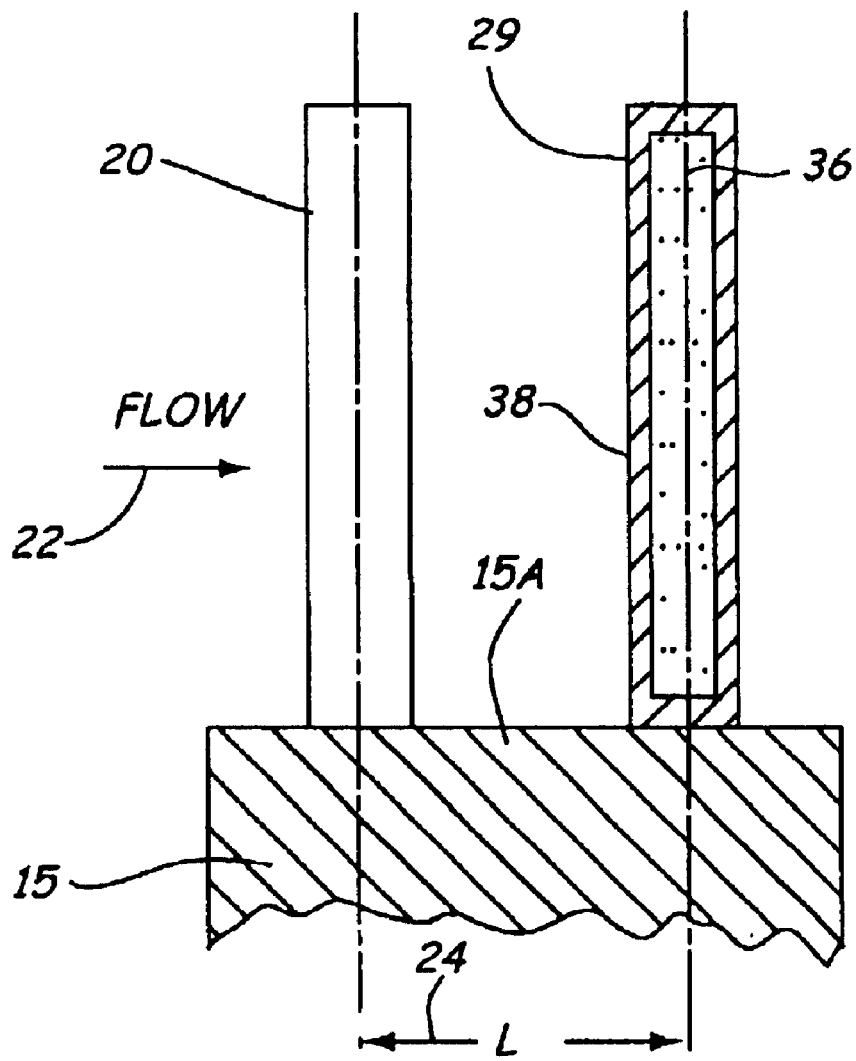
FIG. 5 is a schematic representation of a temperature sensor probe having a deflector post and temperature sensor.

The temperature sensor probe 14, can be simplified, as shown in the schematic showing of FIG. 5, where a temperature probe 29 has a sensor element 36 within an outer sheath 38.

The material of the sheath 38 between the outer surface and the sensor element 36 is thermally conductive and is made very thin so the time response is reduced substantially so that the time response is improved.

As air flows past the post 20 and the temperature sensor probe 14 in the direction indicated by arrow 22, the air flowing around the post 20 will become turbulent. The center to center distance L indicated at 24 between the post 20 and the sensor probe 14 measured in upstream direction from the sensor probe 14 or 29, is preferably approximately 3 times the diameter or lateral dimension of the temperature sensor probe. It was discovered that at different mass flow rates, the time response was between 10% and 18% better than with no deflector post upstream of the temperature sensor probe.

Figure 6:
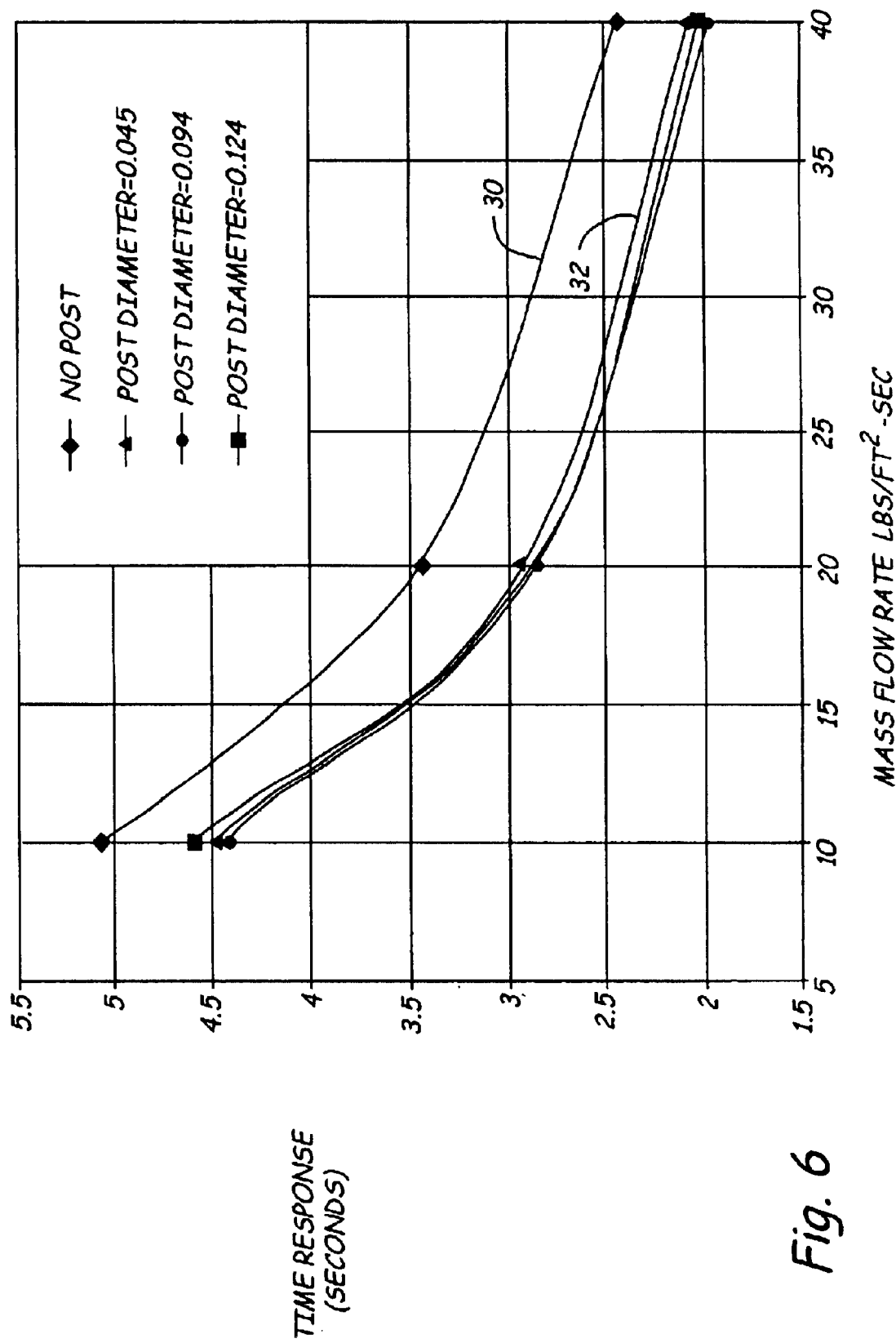
FIG. 6 is a time response versus mass flow rate curve illustrating the effects of having a deflector post of different diameters using the same sensor probe.

In FIG. 6, the graphical representation shows the time response in seconds along a vertical or X coordinate axis, and the mass flow rate in pounds per cubic foot per second on the y or horizontal axis. Air is the fluid flowing, the time response was determined with no deflector post upstream, and with a post 20 upstream, using the same temperature sensor probe 14 in all the tests. The upper graph line 30 shows that the time response at a mass flow of 40 lbs. per square foot per second was approximately 2.5 seconds before the indicated temperature stabilized, while with a deflector post 20 upstream, as a lower set of curves show, the time response was down to just slightly over 2 seconds without any substantial changes in the mass flow, and with the same temperature sensor probe.

The diameter of the deflector post 20 was varied for experimentation. The lower set of curves 32 illustrates the time response of the same temperature sensor probe with deflector posts of different diameters. It can be seen that the curves were very close to each other with the diameter of the deflector posts at selected diameters, between 0.045 inches and 0.124". At the lowest mass flow rate tested, which was 10 lbs./ft squared second, the time response with no post (curve 30) was over 5 seconds, while with a deflector post, it was in the range of 4.5 seconds.

The center to center distance L shown at 24 in the drawings remained the same for the tests which were recorded in FIG. 6.

The temperature sensor probes are necessarily small because of the location, and they are damaged by particles that may be picked up by a turbine engine on an aircraft on the ground in particular. The deflector post 20 not only decreases the time response by permitting reduction in material for the sheath or housing for the temperature sensing element, because particles are deflected and the strength requirements are reduced but also by changing the air flow patterns so the flow in duct 15B becomes turbulent before the air flows past the temperature sensor probe. The port or deflector shields the temperature sensor probe from direct impaction by particles.

Although the present invention has been described with reference to preferred embodiments, workers skilled in the art will recognize that changes may be made in form and detail without departing from the spirit and scope of the invention.

What is claimed is:

1. A temperature sensor probe assembly comprising a probe housing having a base, a temperature sensor probe having a temperature sensor element therein and mounted on a surface, the temperature sensor probe receiving fluid flow moving in a primary fluid flow direction, and a deflector post mounted on the base comprising a cylinder positioned entirely upstream of the temperature sensor probe and spaced therefrom in an upstream direction, to divert fluid flow from impinging directly on the temperature sensor probe, the temperature sensor probe and the deflector post both being elongated along separate longitudinal axes and both extending outwardly from the surface into fluid flow, and wherein the probe housing includes wall portions along lateral sides of the temperature sensor probe, an inlet opening in the housing facing in the direction of air flow, and an outlet opening on a downstream side of the probe housing, whereby air flow will enter the inlet opening and exit through the outlet opening and will flow past the deflector post and the temperature sensor probe.

2. The temperature sensor probe assembly of claim 1, wherein the deflector post has a larger dimension transverse to its longitudinal axis than a dimension of the temperature sensor probe transverse to the longitudinal axis of the temperature sensor probe.

3. The temperature sensor probe assembly of claim 1, wherein the deflector post is a right circular cylinder and is positioned upstream of the temperature sensor probe a distance substantially equal to three times a diameter of the temperature sensor probe.

4. The temperature sensor probe assembly of claim 1, wherein the deflector post is positioned adjacent the inlet opening of the probe housing.

5. The temperature sensor probe assembly of claim 4, wherein said inlet opening has a lateral width that is greater than a width of the deflector post, whereby air can flow along lateral sides of the deflector post to the outlet opening of the probe housing.

6. A temperature sensor probe assembly comprising a support, a temperature sensor probe having a temperature sensor element mounted on the support, the support having a base for mounting with the support in a fluid flow, walls on the support forming a flow duct at an outer end, said flow duct having a fluid flow inlet and an outlet forming a flow path, the temperature sensor probe being positioned to extend into the flow path in the flow duct and spaced in a downstream direction from the fluid flow inlet, and a deflector post positioned adjacent the fluid flow inlet and upstream of the temperature sensor probe and being of size to deflect fluid flowing through fluid flow inlet toward the outlet along the flow path from directly impinging on the temperature sensor probe, causing turbulence of the fluid and improving time response of the temperature sensor probe.

7. The temperature sensor probe assembly of claim 6, wherein said temperature sensor probe and said deflector post are both substantially cylindrical in cross section and are elongated, and extend from the base substantially the same distance.

8. The temperature sensor probe assembly f claim 7, wherein the deflector post is substantially the same diameter as the temperature sensor probe.

9. The temperature sensor probe assembly of claim 6, wherein said flow duct has a wall at an outlet end thereof, said temperature sensor probe being supported on the wall at the outlet end of the flow duct.

* * * * *